(12) United States Patent
Pezeshki et al.

(10) Patent No.: US 11,539,405 B2
(45) Date of Patent: Dec. 27, 2022

(54) ADAPTIVE JOINT AND NON-JOINT QCL INDICATION VIA UE REPORT

(71) Applicant: QUALCOMM Incorporated, San Diego, CA (US)

(72) Inventors: Hamed Pezeshki, San Diego, CA (US); Arumugam Chendamarai Kannan, San Diego, CA (US); Tao Luo, San Diego, CA (US); Yan Zhou, San Diego, CA (US); Wooseok Nam, San Diego, CA (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/088,366

(22) Filed: Nov. 3, 2020

(65) Prior Publication Data

US 2021/0135714 A1 May 6, 2021

Related U.S. Application Data

(60) Provisional application No. 62/930,535, filed on Nov. 4, 2019.

(51) Int. Cl.
*H04B 7/06* (2006.01)
*H04B 7/0417* (2017.01)
(Continued)

(52) U.S. Cl.
CPC ......... *H04B 7/0417* (2013.01); *H04B 7/0486* (2013.01); *H04B 7/0617* (2013.01);
(Continued)

(58) Field of Classification Search
CPC . H04W 16/04; H04W 16/22; H04W 28/0236; H04W 28/08; H04W 28/18;
(Continued)

(56) References Cited

U.S. PATENT DOCUMENTS

2018/0288645 A1 10/2018 Lee et al.
2018/0309553 A1* 10/2018 Cao ....................... H04L 5/0048

OTHER PUBLICATIONS

International Search Report and Written Opinion—PCT/US2020/058873—ISA/EPO—dated Jan. 13, 2021.

* cited by examiner

*Primary Examiner* — Minh Trang T Nguyen
(74) *Attorney, Agent, or Firm* — Norton Rose Fulbright US LLP

(57) ABSTRACT

In one aspect, a method of wireless communication includes receiving, by a user equipment (UE), data from one or more beam pairs of a plurality of beams at least partially concurrently; determining, by the UE, one or more signal parameters for the one or more beam pairs; determining, by the UE, one or more joint quasi co-located (QCL) indicators for the one or more beam pairs and one or more non-joint QCL indicators for the one or more beam pairs; and transmitting, by the UE, a measurement report including the one or more joint QCL indicators and the one or more non-joint QCL indicators. In another aspect, a method of wireless communication includes determining a particular beam or beams for transmitting second data based on the measurement report; and transmitting the second data using the particular beam or beams. Other aspects and features are also claimed and described.

30 Claims, 9 Drawing Sheets

(51) Int. Cl.
*H04B 7/0456* (2017.01)
*H04B 17/318* (2015.01)
*H04B 17/336* (2015.01)
*H04W 24/10* (2009.01)

(52) U.S. Cl.
CPC ......... *H04B 7/0626* (2013.01); *H04B 17/318* (2015.01); *H04B 17/336* (2015.01); *H04W 24/10* (2013.01)

(58) Field of Classification Search
CPC . H04W 28/20; H04W 28/22; H04W 72/0453; H04W 72/0486; H04W 72/0493; H04W 84/005; H04W 88/08; H04W 16/18; H04W 28/0205; H04W 16/14; H04W 24/08; H04W 28/16; H04W 48/16; H04B 1/69

See application file for complete search history.

FIG. 5 — 500

| Rank combination | 0: non-joint QCL, 1: joint QCL |
|---|---|
| (rank 1+rank 1) | 0 |
| (rank 1+rank 2) | 0 |
| (rank 2+rank 2) | 1 |
| (rank 2+rank 1) | 0 |

FIG. 6 — 600

| BM report for beam set 1 |
|---|
| B1 |
| B2 |
| B3 |
| B4 |
| B5 |

— 602

| BM report for beam set 2 |
|---|
| B1' |
| B2' |
| B3' |
| B4' |
| B5' |

FIG. 7 — 700

|    | B1' | B2' | B3' | B4' | B5' |
|----|-----|-----|-----|-----|-----|
| B1 | X   | X   | X   | X   | X   |
| B2 | X   | X   | X   | X   | X   |
| B3 | X   | X   | X   | X   | X   |
| B4 | X   | X   | X   | X   | X   |
| B5 | X   | X   | X   | X   | X   |

FIG. 8 — 800

|    | B1' | B2' | B3' | B4' | B5' |
|----|-----|-----|-----|-----|-----|
| B1 | XX  | X   | XX  | X   | X   |
| B2 | XX  | X   | XX  | X   | X   |
| B3 | X   | XX  | X   | X   | X   |
| B4 | X   | X   | X   | XX  | X   |
| B5 | X   | X   | XX  | X   | X   |

| Beam index from beam set 1 | Beam index from beam set 2 | Individual RSRP/SINR for beam set 1 | Individual RSRP/SINR for beam set 2 | Joint combined RSRP/SINR |
|---|---|---|---|---|
| B1 | B3' | X | X | X |
| B3 | B1' | X | X | X |
| B4 | B2' | X | X | X |
| B2 | B4' | X | X | X |

*FIG. 9*

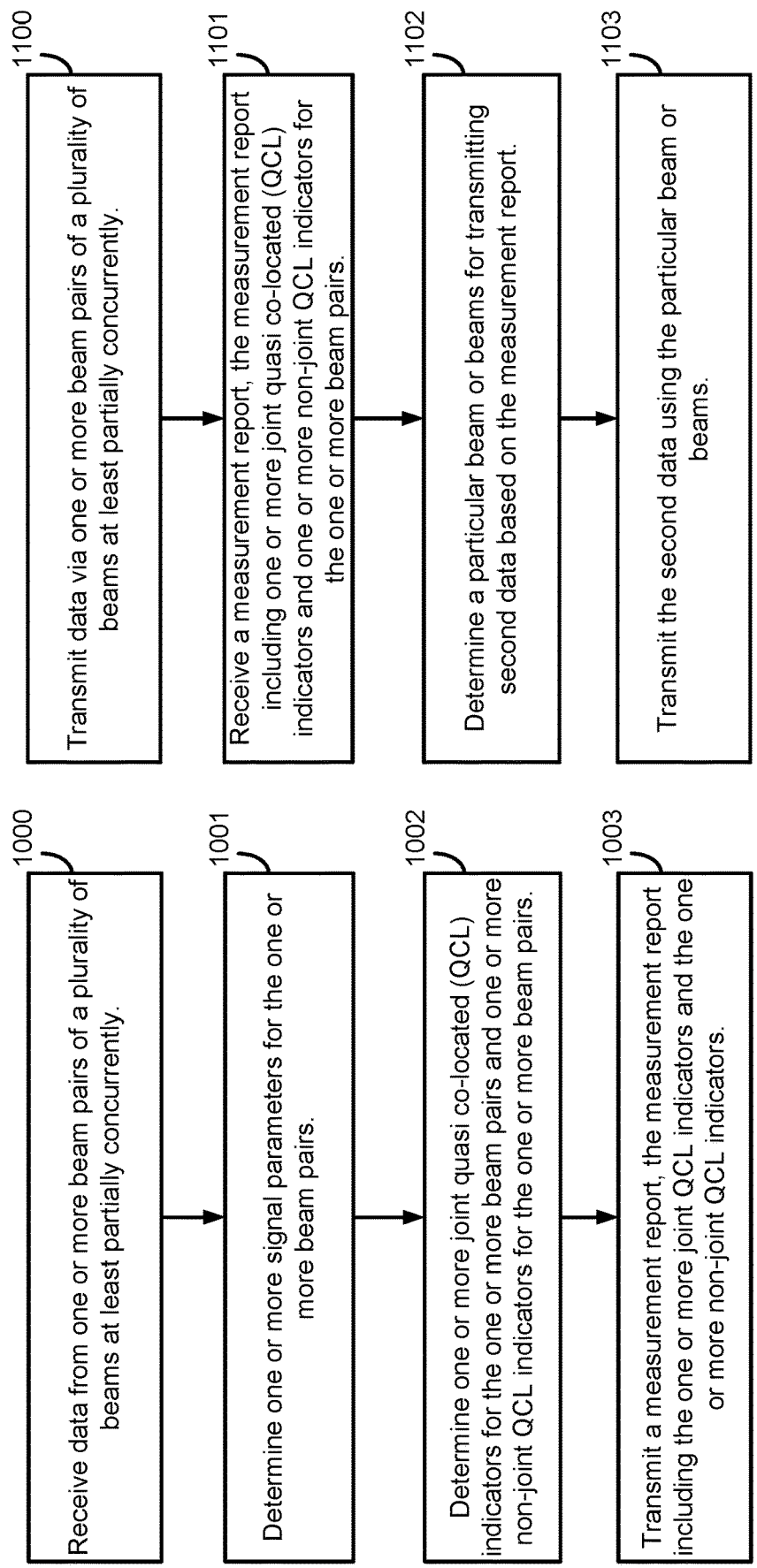

ADAPTIVE JOINT AND NON-JOINT QCL INDICATION VIA UE REPORT

CROSS-REFERENCE TO RELATED APPLICATIONS

This application claims the benefit of U.S. Provisional Patent Application No. 62/930,535, entitled, "ADAPTIVE JOINT AND NON-JOINT QCL INDICATION VIA UE REPORT," filed on Nov. 4, 2019, which is expressly incorporated by reference herein in its entirety.

TECHNICAL FIELD

Aspects of the present disclosure relate generally to wireless communication systems, and more particularly, to beam management. Certain embodiments of the technology discussed below can enable and provide enhanced beam reporting and beam management for simultaneous transmission and reception.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques relate to improved methods, systems, devices, and apparatuses that support enhanced beam management and reporting for multiple beam communications, including for simultaneous transmission and/or reception. Such enhanced beam management and reporting may enable enhanced operation in next generation wireless modes, such as improved operation in simultaneous transmission and/or reception modes. For example, a device may provide adaptive joint and non-joint quasi co-located (QCL) indications which reduce cross-beam interference and/or enable advanced receiver capabilities to be accounted for. Accordingly, such techniques may increase reliability and throughput.

In one aspect of the disclosure, a method of wireless communication includes receiving, by a user equipment (UE), data from one or more beam pairs of a plurality of beams at least partially concurrently; determining, by the UE, one or more signal parameters for the one or more beam pairs; determining, by the UE, one or more joint quasi co-located (QCL) indicators for the one or more beam pairs and one or more non-joint QCL indicators for the one or more beam pairs; and transmitting, by the UE, a measurement report, the measurement report including the one or more joint QCL indicators and the one or more non-joint QCL indicators.

In an additional aspect of the disclosure, an apparatus configured for wireless communication is disclosed. The apparatus includes means for receiving, by a user equipment (UE), data from one or more beam pairs of a plurality of beams at least partially concurrently; means for determining, by the UE, one or more signal parameters for the one or more beam pairs; means for determining, by the UE, one or more joint quasi co-located (QCL) indicators for the one or more beam pairs and one or more non-joint QCL indicators for the one or more beam pairs; and means for transmitting, by the UE, a measurement report, the measurement report including the one or more joint QCL indicators and the one or more non-joint QCL indicators.

In an additional aspect of the disclosure, a non-transitory computer-readable medium having program code recorded thereon. The program code further includes executable code for causing the computer to receive, by a user equipment (UE), data from one or more beam pairs of a plurality of beams at least partially concurrently; to determine, by the UE, one or more signal parameters for the one or more beam pairs; to determine, by the UE, one or more joint quasi co-located (QCL) indicators for the one or more beam pairs and one or more non-joint QCL indicators for the one or more beam pairs; and to transmit, by the UE, a measurement report, the measurement report including the one or more joint QCL indicators and the one or more non-joint QCL indicators.

In an additional aspect of the disclosure, an apparatus configured for wireless communication is disclosed. The apparatus includes at least one processor, and a memory coupled to the processor. The processor is configured to determine, by the UE, one or more signal parameters for the one or more beam pairs; to determine, by the UE, one or more joint quasi co-located (QCL) indicators for the one or more beam pairs and one or more non-joint QCL indicators for the one or more beam pairs; and to transmit, by the UE, a measurement report, the measurement report including the one or more joint QCL indicators and the one or more non-joint QCL indicators.

In yet another aspect of the disclosure, a method for wireless communication includes transmitting, by a network entity, data via one or more beam pairs of a plurality of beams at least partially concurrently; receiving, by the network entity, a measurement report, the measurement report including one or more joint quasi co-located (QCL) indicators and one or more non-joint QCL indicators for the one or more beam pairs; determining, by the network entity, a particular beam or beams for transmitting second data based on the measurement report; and transmitting, by the network entity, the second data using the particular beam or beams.

In an additional aspect of the disclosure, an apparatus configured for wireless communication is disclosed. The apparatus includes means for transmitting, by a network entity, data via one or more beam pairs of a plurality of beams at least partially concurrently; means for receiving, by the network entity, a measurement report, the measurement report including one or more joint quasi co-located (QCL) indicators and one or more non-joint QCL indicators for the one or more beam pairs; means for determining, by the network entity, a particular beam or beams for transmitting second data based on the measurement report; and means for transmitting, by the network entity, the second data using the particular beam or beams.

In an additional aspect of the disclosure, a non-transitory computer-readable medium having program code recorded thereon. The program code further includes executable code for causing the computer to transmit, by a network entity, data via one or more beam pairs of a plurality of beams at least partially concurrently; to receive, by the network entity, a measurement report, the measurement report including one or more joint quasi co-located (QCL) indicators and one or more non-joint QCL indicators for the one or more beam pairs; to determine, by the network entity, a particular beam or beams for transmitting second data based on the measurement report; and to transmit, by the network entity, the second data using the particular beam or beams.

In an additional aspect of the disclosure, an apparatus configured for wireless communication is disclosed. The apparatus includes at least one processor; and a memory coupled to the processor. The processor is configured: to transmit, by a network entity, data via one or more beam pairs of a plurality of beams at least partially concurrently; to receive, by the network entity, a measurement report, the measurement report including one or more joint quasi co-located (QCL) indicators and one or more non-joint QCL indicators for the one or more beam pairs; to determine, by the network entity, a particular beam or beams for transmitting second data based on the measurement report; and to transmit, by the network entity, the second data using the particular beam or beams.

In another aspect of the disclosure, a method for wireless communication includes transmitting, by a network entity, data via one or more beam pairs of a plurality of beams at least partially concurrently; receiving, by the network entity, a measurement report, the measurement report including an indicator configured to indicate whether the measurement report indicates joint QCL feedback or non-joint QCL feedback; determining, by the network entity, a particular beam or beams for transmitting second data based on the measurement report; and transmitting, by the network entity, the second data using the particular beam or beams.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a diagram of an example of a beam management report bitmap.

FIG. 6 is a diagram of examples of a beam management report arrays.

FIG. 7 is a diagram of an example of a beam management report table.

FIG. 8 is a diagram of another example of a beam management report table.

FIG. 9 is a diagram of yet another example of a beam management report table.

FIG. 10 is a block diagram illustrating example blocks executed by a UE configured according to an aspect of the present disclosure.

FIG. 11 is a block diagram illustrating example blocks executed by a base station configured according to an aspect of the present disclosure.

DETAILED DESCRIPTION

Figure 1:
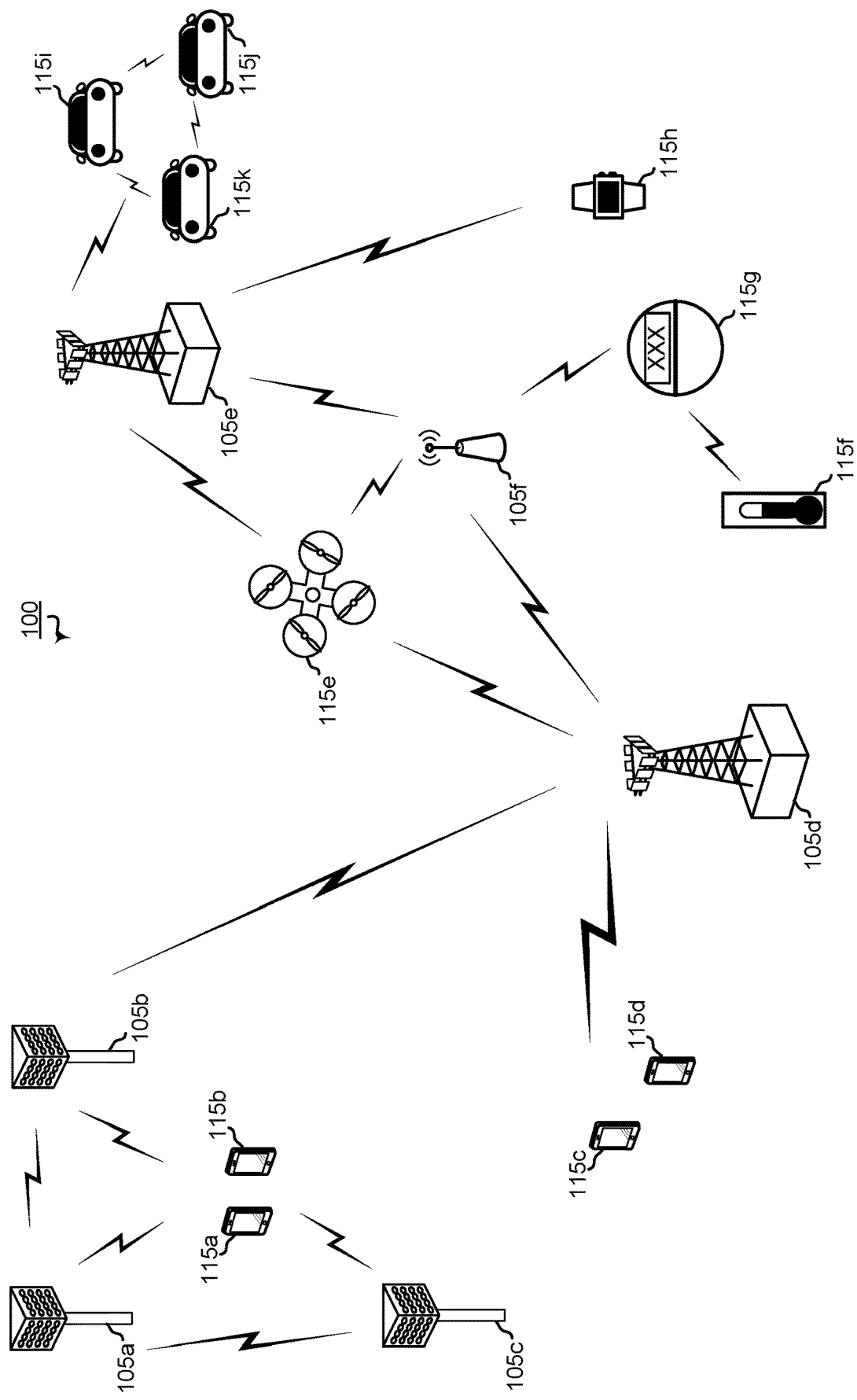
FIG. 1 is a block diagram illustrating details of a wireless communication system according to some embodiments of the present disclosure.

The detailed description is related to beam reporting and beam management enhancements for wireless communications. Conventionally, beam reporting and beam management is based on channel state information (CSI) included in a CSI report. For example, a UE may monitor various channels and beams, such as reference signals thereof, and may report back to a network entity feedback information about the channels and beams. When devices are performing transmission or reception, a UE reports back information on the beams individually which enables the network to select the best individual beams for transmission or reception. However, the two best or highest ranked or scoring beams do not always perform the best for simultaneous transmission or reception. For example, the two highest performing beams for individual transmission may be subject to cross-beam interference when used together. Accordingly, the UE and the network may select beams for simultaneous transmission or reception which have reduced or impaired performance. Such procedures may not achieve high throughput and/or reliability.

The described techniques relate to improved methods, systems, devices, and apparatuses that support enhanced beam management and reporting for multiple beam communications, including for simultaneous transmission and/or reception. For example, a UE may determine beam information on combinations of beams (aka beam combinations or beam pairs) and report the information on the combinations of beams to the network to enable the network to select beam combinations with improved performance and avoid beam combinations with reduced performance. To illustrate, a UE may be able to use adaptive beam reporting for joint QCL indications and/or non-joint QC indications in a CSI report. Such enhanced beam management and reporting operations may enable enhanced operation for multiple beam communication, such as simultaneous transmission/reception. Accordingly, such techniques may increase reliability and throughput and reduce latency.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
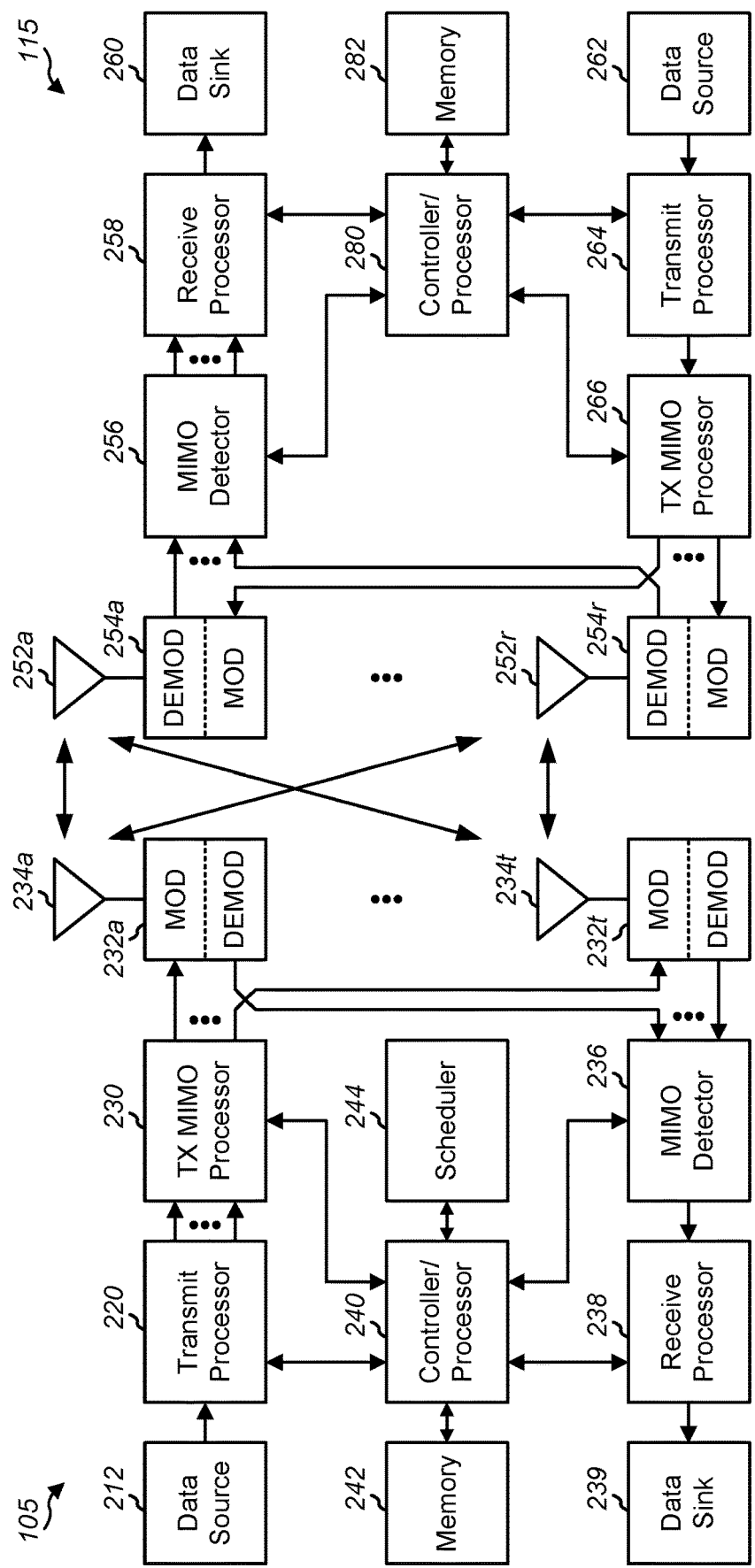
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f* Base station 105 may also be a base station of some other type. As shown in FIG. 2, base station 105 may be equipped with antennas 234*a* through 234*t*, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 10 and 11, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
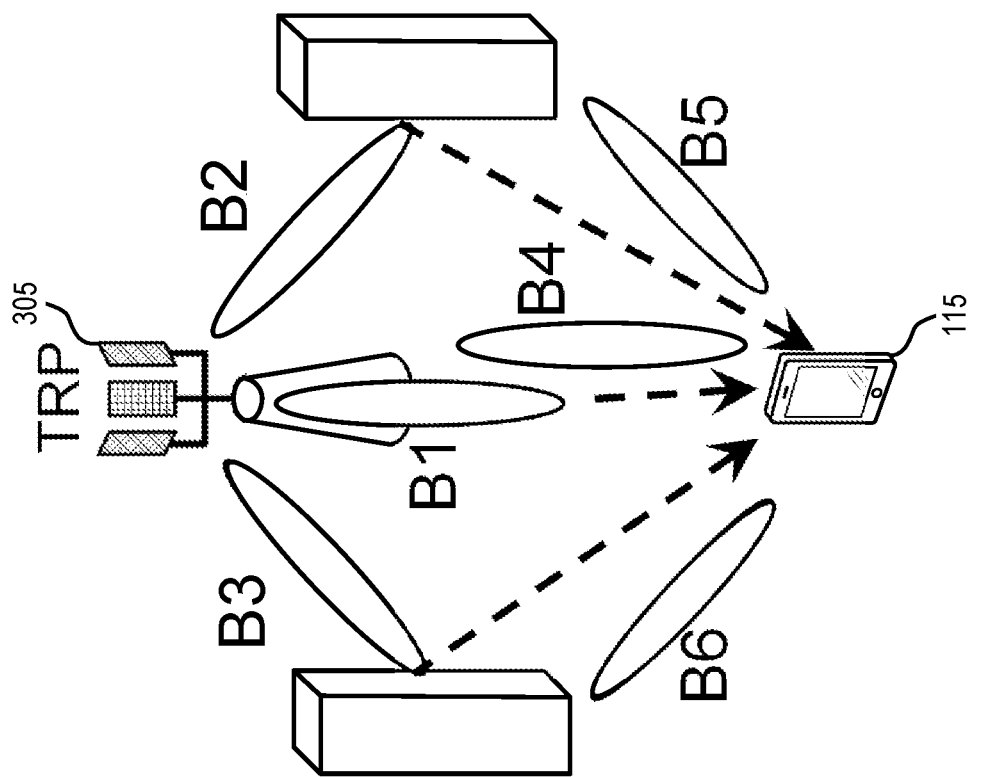
FIG. 3 is a diagram illustrating beam transmission.

FIG. 3 is a diagram illustrating beam transmission. Referring to FIG. 3, a transmission reception point 305 (e.g., a base station with multiple panels) and a UE 115 are illustrated in beam diagram 300. In FIG. 3, three downlink beams are illustrated, that is three transmission beams from the TRP 305 to the UE 115 are illustrated. The beams are generated by beamforming; their signal paths are also illustrated.

A UE 115 may also perform beamforming (e.g., spatial filtering) to receive the transmission beams. The UE 15 may use corresponding "receive beams" (aka beamforming weights) to more accurately receive and process the transmission beams. The receive beams are also illustrated in FIG. 3.

In some implementations, a UE may select one of multiple reception beams (aka beamforming weights) to receive and process a particular beam. As an illustrative example, the UE 115 may select a particular receive beam for a first sector corresponding to B3 from a plurality of receive beams for the first sector. The particular receive beam may be the highest or best performing beam for receiving and processing transmission beam B3.

During simultaneous transmission and/or reception, multiple transmission beams, such as B1, B2, and B3, or any pairwise combination of them, may be sent at the same time or such that at least a portion of one beam overlaps at least one other beam. For example, two transmission beams may overlap in time and/or frequency. Additionally, corresponding receive beams may also be active at the same time, e.g., at least partially concurrently.

Such simultaneous transmission and/or reception may cause cross-beam interference. For example, concurrent or simultaneous use of multiple receive beams may cause cross-beam interference. Such cross-beam interference may not be detectable or determinable by the transmitting device (e.g., TRP 305). To illustrate, the receive beam B4 may cause interference with the receive beam B6 at the receiving device (UE 115), and vice versa. Such cross-beam interference may degrade the performance of one or more of the beams such that an individual beam or beams with the highest individual signal parameters (e.g., received signal reference power (RSRP) and/or signal-to-interference-plus-noise ratio (SINR)) may not produce the highest beam pair signal parameters, that is signal parameters when the beams are paired with each other and used jointly. Accordingly, such beams may not have the highest performance, such as throughput.

The beam pairs that are meant to be paired with each other because they provide a high joint metric, such as combined RSRP and/or combined SINR, may be referred to as joint QCL, and the beams that perform well based on individual metrics may be referred to as non-joint QCL. Joint or combined metrics may refer to metrics which are used during simultaneous transmission and/or reception operations by two or more beams (e.g., beam pairs). Additionally, or alternatively, the beams that are not necessarily meant to be paired with each other because they do not provide a high joint metric (even though they may provide high individual metrics if not paired with each other) may be referenced to as non-joint QCL. Individual or non-joint metrics may refer to metrics which are used during transmission or reception operations by a single beam.

Such a determination between joint QCL and non-joint QCL may be based on the joint metric or metrics and on one or more thresholds and additionally or alternatively based on one or more individual metrics and one or more corresponding thresholds. For example, a single threshold may be used to determine joint and non-joint QCL. To illustrate, if a value is above the threshold, the beam is joint QCL, and if the value is below the threshold, the beam is non-joint QCL. As another example, multiple thresholds may be used. To illustrate, if a value is above a first threshold, the beam is joint QCL, and if the value is below a second threshold, the beam is non-joint QCL. If the value is between the first and second thresholds, no indication may be provided. Additionally, or alternatively, joint and/or non-joint QCL may have multiple thresholds. For example, if a value is above a first joint QCL threshold, the beam is joint QCL preference level 1, and if the value is above a second joint QCL threshold, the beam is joint QCL preference level 2.

As yet another example, joint metrics may be used to determine joint QCL and individual metrics may be used to determine non-joint QCL. To illustrate, for joint QCL indication, the beam pairs are sorted based on joint combined SINR, and for non-joint QCL indication, the beams pairs are sorted based on a function of individual metrics for the two beams of the beam pair. For instance, the beam pairs that have the largest sum of individual L1-RSRP or individual L1-SINR are ranked as the most preferred beam pair for non-joint QCL. Accordingly, such joint QCL and non-joint QCL rankings or lists are not necessarily mutually exclusive because the metrics used are different, such as joint vs individual.

Systems and methods described herein are directed to enhanced beam management and reporting for multiple beam communications, including for simultaneous transmission and/or reception. The enhanced functionality may enable enhanced or improved operation in simultaneous transmission and/or reception modes, such as by reducing cross-beam interference and/or accounting for advanced receiver capability. To illustrate an advanced device may have high cross-beam interference tolerance and/or mitigation. Such devices may be able to transmit and/or receive without error even when using non-joint QCL beams. Thus, such an advanced device may utilize the best individual beams from non-joint QCL indications for simultaneous transmission and/or reception and without issue from higher cross-beam interference. Additionally, or alternatively, some devices may be reduced capability devices and operate in single communication modes (e.g., not in simultaneous transmission and/or reception). Accordingly, it may be beneficial to report both joint QCL indications and non-joint QCL indications for some advanced capability networks which support a wide range of devices.

In some implementations, the systems and methods described herein enable adaptive beam reporting for joint QCL and non-joint QCL indications. For example, a UE may report joint QCL measurements, rankings, and/or preferences in addition to or in the alternative of non-joint QCL measurements, rankings, and/or preferences. Accordingly, such systems and methods described herein can better support multiple beam communications, including for simultaneous transmission and/or reception, and a wide range of devices. Consequently, throughput and reliability may be increased across devices of different capabilities.

Figure 4:
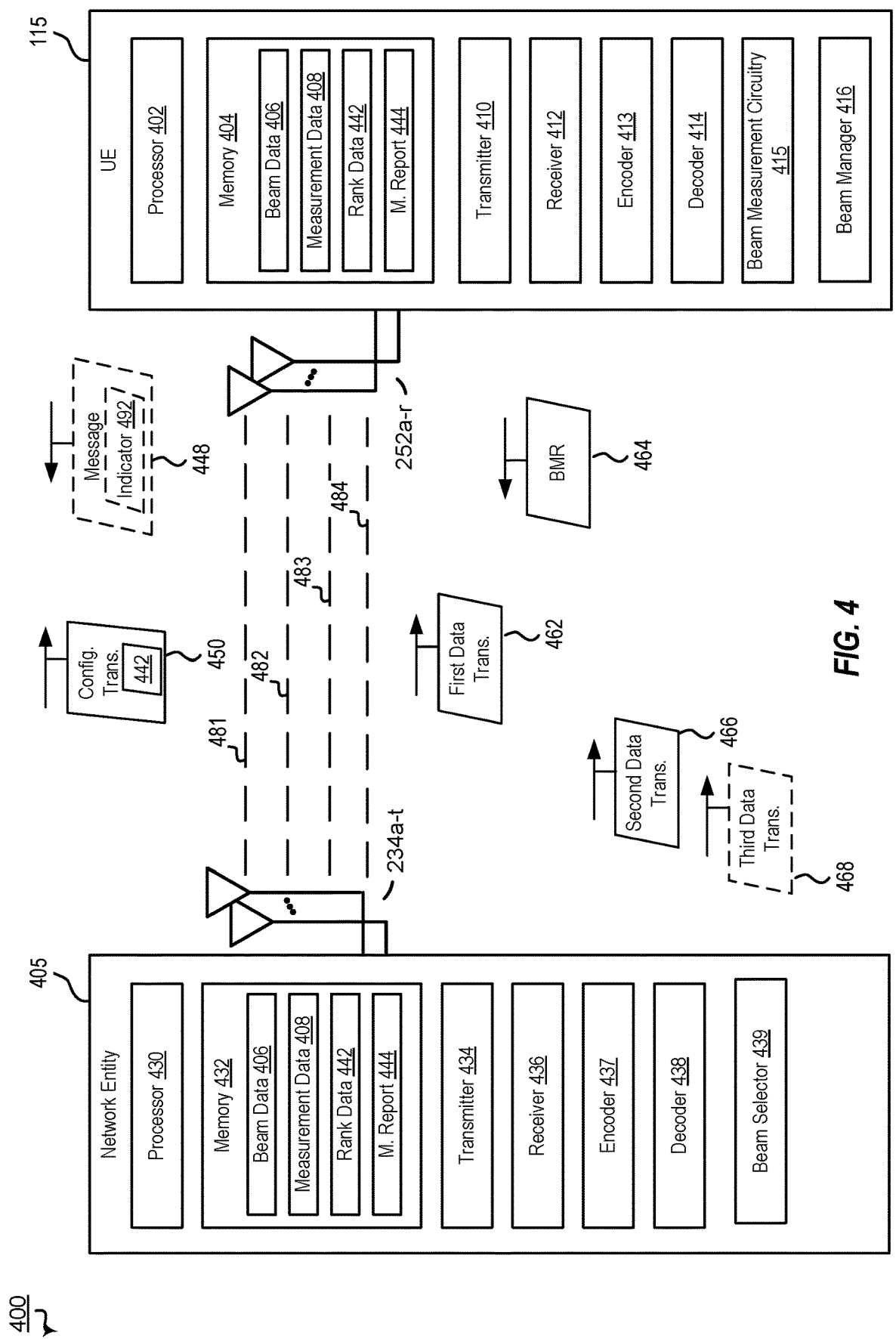
FIG. 4 is a block diagram illustrating an example of a wireless communications system that enables enhanced beam management and reporting in accordance with aspects of the present disclosure.

FIG. 4 illustrates an example of a wireless communications system 400 that supports adaptive joint and non-joint QCL indication in accordance with aspects of the present disclosure. In some examples, wireless communications system 400 may implement aspects of wireless communication system 100. For example, wireless communications system 400 may include UE 115, network entity 405, and optionally second network entity (e.g., a second base station 105). Enhanced beam management and reporting may reduce cross-beam interference and increase receiver functionality, and thus may increase throughput and reliability.

Network entity 405 and UE 115 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that sub-carrier spacing (SCS) may be equal to 15, 30, 60, or 120 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

For example, data and control channel transmissions 452 and 454 may be transmitted between UE 115 and network entity 405. Optionally, sidelink channel transmission may be transmitted between UE 115 and network entity 405 or second network entity. Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 includes processor 402, memory 404, transmitter 410, receiver 412, encoder, 413, decoder 414, beam measurement circuitry 415, beam manager 416 and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store beam data 406, measurement data 408, rank data 442, measurement report data 444, or a combination thereof, as further described herein.

The beam data 406 includes or corresponds to data for indicating or identifying a plurality of transmission beams, reception beams, downlink beams, uplink beams, beam sets, or a combination thereof. Additionally or alternatively, the beam data 406 indicates a ranking or order of the beams (e.g., number of layers for each beam), a sector of the beams, beam combinations, or a combination thereof. The measurement data 408 may include data indicating measurement values for one or more of the beams of the beam data 406. In some implementations, the measurement data includes multiple types of measurement data and/or derived measurement data. To illustrate, the measurement data may include RSRP, SINR, and/or max min SINR. Additionally or alternatively, the measurement data 408 includes measurements for beam combination (e.g., beam pairs).

The rank data 442 indicates a ranking or sorting of multiple beams of the plurality of beams. The rank data 442 may be determined based on the measurement data 408. In some implementations, the rank data 442 includes one or more thresholds (e.g., joint QCL thresholds, non-joint QCL thresholds, etc.) configured to sort and rank the measurement data 408. The measurement report data 444 includes or corresponds to a report including joint QCL and non-joint QCL indications, such as described further with reference to FIGS. 5-9. The report may include or correspond to a beam management report and/or a CSI report. In some implementations, the measurement report only includes one type of indication, such as joint QCL indications only. Such a measurement report may be signaled by a report type indicator bit, as described further with reference to FIG. 7.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Beam measurement circuitry 415 may be configured to determine beam measurements and parameters. For example, beam measurement circuitry 415 is configured to determine RSRP and/or SINR of one or more beams. Additionally, the beam measurement circuitry 415 may be configured to determine measurements for beam combinations. Beam manager 416 may be configured to determine and/or evaluate beam measurements and to generate beam measurement reports. For example, beam manager 416 is configured to determine a ranking or sorting of beams based on the measurement data 408.

Network entity 405 includes processor 430, memory 432, transmitter 434, receiver 436, encoder 437, decoder 438, beam selector 439, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store beam data 406, measurement data 408, rank data 442, measurement report data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2. Encoder 437 and decoder 438 may include the same functionality as described with reference to encoder 413 and decoder 414, respectively. Beam selector 439 may include similar functionality as described with reference to beam manager 416. Beam selector 439 is configured to select beams pairs (or beams) for partially concurrent or simultaneous transmission based on information from the UE 115. In some implementations, the beam selector 439 selects beam pairs based on rankings or preferences indicated by the UE 115. In other implementations, the beam selector 439 determines beam pairs based on measurement data determined by the UE 115 or other "soft" information.

During operation of wireless communications system 400, network entity 405 and/or a second network entity may determine that UE 115 has enhanced beam management and reporting capability. For example, UE 115 may transmit a message 448 that includes an enhanced beam management and reporting indicator 492. Indicator 492 may indicate enhanced beam management and reporting capability or a particular type of enhanced beam management and reporting, such as adaptive joint and non-joint QCL indication. In some implementations, network entity 405 sends control information to indicate to UE 115 that enhanced beam management and reporting is to be used. For example, in some implementations, message 448 (or another message, such as configuration transmission 450) is transmitted by the network entity 405. The configuration transmission 450 may include or indicate to use enhanced beam management and reporting or to adjust or implement a setting of enhanced beam management and reporting, such as a particular type of indication (e.g., joint QCL or non-joint QCL) and/or a particular type of measurement report.

During operation, devices of wireless communications system 400, transmit control, data, and/or sidelink channel transmissions to other devices of wireless communications system 400. For example, UE 115 and a base station (e.g., 405) may transmit control and data information on control and data channels. Multiple end devices or UEs may transmit control and data information on one or more sidelink channels directly to each other and independent of a base station of wireless communications system 400. One or more of the end devices or UEs may perform beam management and reporting operations. For example, UE 115 may determine and track beam measurement values for one or more beams. Additionally, UE 115 may estimate beam measurement values for some beams based on the performance of similar beams, such as beams of a similar order (e.g., number of layers).

To illustrate, UE 115 receives first data transmissions 462 via one or more beams. UE 115 determines beam parameters of the one or more beams and generates a beam management report. The UE 115 sends the beam management report to the network entity 405 in a beam management report message 464 (e.g., CSI report message). The network entity 405 may schedule transmissions for second data to the UE 115 based on the beam management report message 464. As illustrated in FIG. 4, the network entity 405 sends second data to the UE 115 using one or more beams, such second data transmission 466 and an optional third data transmission 468. The second and third data transmissions 466, 468 may be at least partially overlapping in a particular domain, such as simultaneous transmissions. In some implementations, the network entity 405 may signal the beams using a control message. For example, the network entity 405 may send a control message (e.g., DCI) indicating the one or more beams to be used to transmit the second data.

Thus, FIG. 4 describes enhanced beam management and reporting operations for multi beam communications. Using enhanced management and reporting operations may enable improvement when operating in simultaneous transmission and/or reception modes. Performing enhanced beam management and reporting operations enables a network to improve throughput and reliability.

FIG. 5 is a diagram of an example of a beam management report bitmap. In the example of FIG. 5, bitmap 500 includes two columns, a rank combination column and an indicator column. The rank combination column is configured to indicate or denote a particular rank combination of beam pairs, such as rank 1 and rank 1 beams, rank 1 and rank 2 beams etc. Each beam, such as the beams B1-B3 from FIG. 3, may have a corresponding rank or based on an order number or number of layers of the beam. The indicator column is configured to indicate a preference (e.g., a preference indicator) for joint QCL or non-joint QCL for a corresponding rank (e.g., a preference for joint QCL or non-joint QCL beam candidates). As illustrated in the example of FIG. 5, a bit value of 0 indicates a preference for non-joint QCL and a bit value of 1 indicates a preference for joint QCL. Thus, for the example of FIG. 5, beam pairs for two rank 2 beams are indicated as joint QCL preferred, and beam pairs for other rank combinations are indicated as non-joint QCL preferred. In other implementations, a measurement report includes multiple type preference indicators configured to indicate at least one preference for joint QCL beam candidates and at least one preference for non-joint QCL beam candidates. For example, the measurement report may include multiple bitmaps 500 (e.g., one for joint and one for non-joint QCL) or an extra column such that one column indicates a preference or no preference for a first QCL type and another column indicates a preference or no preference for a second QCL type.

Accordingly, a receiving device, such as the TRP 305 of FIG. 3 or the network entity of FIG. 4, may schedule data and beams based on the bitmap 500. As an illustrative example, a transmitting device may send data via two rank 2 beams simultaneously that perform well jointly for joint QCL. As another example, a transmitting device may send data, at least partially concurrently or simultaneously, via another beam rank combination that does not perform well jointly for non-joint QCL.

FIG. 6 is a diagram of examples of a beam management report arrays. In the examples of FIG. 6, two beam management report arrays are illustrated, array 600 and array 602. Array 600 is a ranked or sorted array of beams for beam set 1, and array 602 is a ranked or sorted array for beam set 2. Beam sets may include or correspond to beams of a particular sector, panel or device. For example, beam sets may correspond to beams created by a particular UE panel. To illustrate, beams set 1 corresponds to UE panel 1 and beam set 2 corresponds to UE panel 2.

A device, such as the UE of FIG. 3 or 4, may generate a beam management report array based on one or more beam parameters or metrics. For example, the arrays 600 and 602 may be sorted based on highest L1-RSRP value.

Although the sorted arrays 600 and 602 correspond to ranking beams of individual beam sets, in other implementations, an array may include and sort beams of multiple beam sets when they are transmitted/received simultaneously, such as provide a preference or ranking for B1 and B1'.

Additionally or alternatively, although individual beam rankings are indicated by the sorted arrays 600 and 602, in other implementations, the arrays may include joint QCL rankings only, non-joint QCL rankings only, or both join and non-joint QCL rankings.

FIG. 7 is a diagram of an example of a beam management report table. Referring to FIG. 7, a table 700 for reporting joint and non-joint QCL indications is shown. In FIG. 7, table 700 includes 5 columns and 5 rows, where each column or row corresponds to a particular beam. In the example of FIG. 7, the rows correspond to beams of beam set 1 and the columns correspond to beams of beam set 2. In other implementations, a row and/or column may include beams from different beam sets.

A beam management report, such as management report of FIG. 4, may include an indicator (e.g., indicator bit or flag bit) and table 700. Indicator may be configured to indicate whether the table 700 is for joint QCL indication or non-joint QCL indication. For example, when the indicator has a first value (e.g., 0), table 700 provides non-joint QCL indications and when the indicator has a second value (e.g., 1), table 700 provides joint QCL indications. To illustrate, a table value such as a first table value for the beam pair of B1 and B1' provides an indication for joint QCL. As an illustrative example, a first value (e.g., 0) indicates no preference for joint QCL and a second value (e.g., 1) indicates a preference for joint QCL.

In some implementations, the table, i.e., entries/cell values thereof, may include additional values, such as positive integers. The additional values may be configured to provide a ranking or a level of preference for the joint QCL or non-joint QCL indication. In other implementations, each cell value is binary and corresponds to a single bit.

Alternatively, the indicator may not be included in a measurement report. In such implementations, a first value (e.g., 0) indicates a preference for non-joint QCL and a second value (e.g., 1) indicates a preference for joint QCL.

FIG. 8 is a diagram of another example of a beam management report table. Referring to FIG. 8, a table 800 for reporting joint and non-joint QCL indications is shown. In FIG. 8, table 800 includes 5 columns and 5 rows for cell entries, where each column or row corresponds to cell entries a particular beam. In the example of FIG. 8, the rows correspond to beams of beam set 1 and the columns correspond to beams of beam set 2. In other implementations, a row and/or column may include beams from different beam sets.

As compared to table 700 of FIG. 7, table 800 may be configured to include multiple rankings per beam combination. That is a single cell value may include multiple indications, that is an indication for non-joint QCL and an indication for joint QCL. To illustrate, the table may include multiple values such as 1 and 2 for a first cell for beam pair B1 and B1'. An order of the value may indicate which type of QCL indication is being provided. For example, a first cell value may provide a ranking preference for non-joint QCL and a second cell value may provide a ranking preference for joint QCL.

In other implementations, one or more cells may not include multiple values. In such implementations, the values for a given cell may be signaled by an individual indicator bit. For example, a sign bit may be used to indicate whether the ranking or preference (e.g., numerical value such as 4) is for non-joint QCL or joint QCL. To illustrate, a value of −1 may indicate a strong or top preference for non-joint QCL and a value of −4 may indicate a weak or low preference for non-joint QCL for the particular beam pair.

In a particular implementation, table 800 includes multiple values per each cell (e.g., 2 per cell) and a sign bit for each value of each cell. By using sign bits, multiple preferences can still be signaled, with possibly less overhead as compared to other tables. Additionally, no preference can be provided for a particular QCL type. For example, if a cell includes only a single value, such as 2, a transmitting device can indicate a particular preference (e.g., a second most preferred beam) for the beam pair for joint QCL, and optionally to not use the beam pair for non-joint QCL.

A particular value, such as zero, may be used to indicate that a particular QCL type is not preferred (e.g., either joint QCL or non joint QCL) or that multiple QCL types (e.g., joint QCL and non-joint QCL) is not preferred. Alternatively, a particular value, such as zero, may be used to indicate that no preference is provided for a particular QCL type.

Additionally, as compared to table 700 of FIG. 7, table 800 may not be transmitted with a table indicator or table indicator bit. To illustrate, as table 800 includes multiple individual cell value indicators, that is beam pair indicators or sign bits, table 800 does not need an overall table indicator.

FIG. 9 is a diagram of yet another example of a beam management report table. Referring to FIG. 9, a table 900 for reporting joint and non-joint QCL indications is shown. In FIG. 9, table 900 includes 5 columns and 4 rows, where each row corresponds to a particular beam combination and information therefor. In the example of FIG. 9, the first column corresponds to beams of beam set 1 and the second column corresponds to beams of beam set 2. The third and fourth columns correspond to measurement values for the first and second columns respectively. The fifth column corresponds to measurement values for a beam combination (e.g., beam pair) of the first and second columns.

As compared to table 700 of FIG. 7 and table 800 of FIG. 8, table 900 may be configured to include or indicate measurement values or other "soft information," e.g., information which enables the receiving device to make a determination or preference ranking. In such implementations, the receiving device (e.g., base station) may rank or sort the beams and beam combinations based on table 900 of the measurement report. As table 900 may be large in size (e.g., bits) as compared to tables 700 or 800, table 900 may include a measurement values for a subset of beams and/or beam combinations to reduce the size of table 900 and network overhead.

Although the beam measurement report elements of FIGS. 5-9 illustrate discrete examples, one or more elements of FIGS. 5-9 may be combined or modified based on one or more other elements of FIGS. 5-9. Additionally, although the beam measurement report elements of FIGS. 5-9 illustrate elements directed to beam combinations of only two beams, i.e., beam pairs, the beam measurement report elements described herein can include indications for beam combinations of more than two beams, such as 3 beams, 4 beams, etc., in other implementations.

Figure 12:
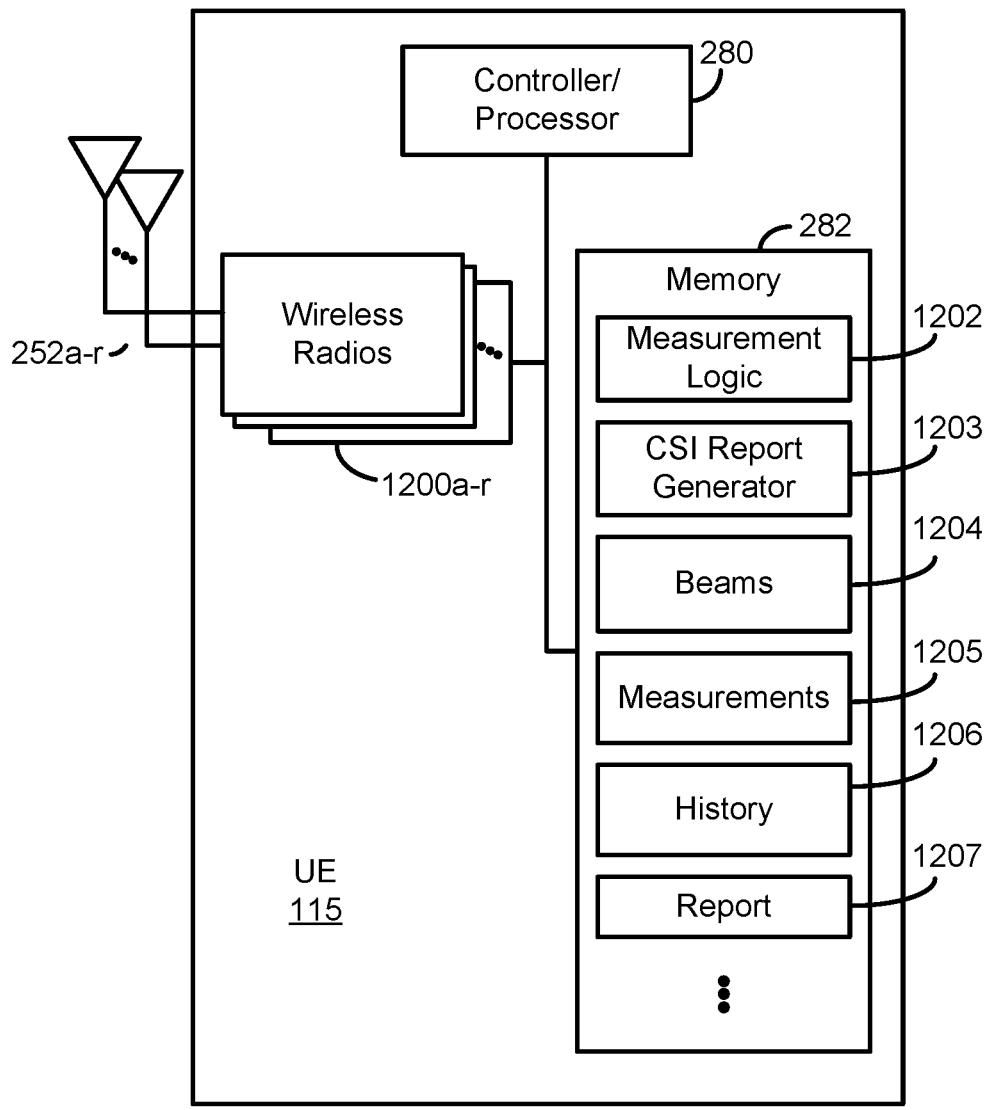
FIG. 12 is a block diagram conceptually illustrating a design of a UE configured to perform adaptive joint and non-joint quasi co-located (QCL) indications according to some embodiments of the present disclosure.

FIG. 10 is a block diagram illustrating example blocks executed by a UE configured according to an aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r. Wireless radios 1200a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 12, memory 282 stores measurement logic 1202 (e.g., adaptive joint and non-joint QCL logic), CSI report generator logic 1203, beam data 1204, measurement data 1205, history data 1206, and report data 1207.

At block 1000, a wireless communication device, such as a UE, receives data from one or more beam pairs of a plurality of beams at least partially concurrently. A UE, such as UE 115, receives transmissions partially concurrently or simultaneously via one or more beam pairs using wireless radios 1200a-r and antennas 252a-r. The one or more beam pairs may include or correspond the transmission and reception beams B1-B6 of FIG. 3, such as pairs of transmission beams and their corresponding pair of reception beams.

The UE 115 may execute, under control of controller/processor 280, measurement logic 1202, stored in memory 282. The execution environment of measurement logic 1202 provides the functionality for UE 115 to define and perform the beam measurement procedures of the beam management and reporting operations. Additionally, the UE 115 may execute CSI report generator logic 1203. The execution environment of measurement logic 1202 (and optionally CSI report generator logic 1203) defines the different beam management and reporting processes, such as measuring beams and beam pairs, sorting or ranking beam pairs, identifying beam order or level (e.g., MIMO layer number), selecting a measurement report type, generating a measurement report, or a combination thereof.

At block 1001, the UE 115 determines one or more signal parameters for the one or more beam pairs. The signal parameters may include or correspond to beam parameters, such as layer one parameters or physical layer parameters. For example, the signal parameters (e.g., joint beam metric) may include joint RSRP, joint SINR, maxmin RSRP, maxmin SINR, etc. To illustrate a low maxmin value may include or correspond to a most non-asymmetrical set of values (or most symmetrical set of value). As an example, SINR values of 1 and 20 may have a higher maxmin (e.g., difference between max and min values) than SINR values of 8 and 9, but SINR values 8 and 9 are more symmetrical. Additionally or alternatively, the UE 115 signal parameters for individual beam, such as individual RSRP or individual SINR. The UE 115 determines the one or more signal parameters under the execution logic of the measurement logic 1202.

At block 1002, the UE 115 determines one or more joint quasi co-located (QCL) indicators for the one or more beam pairs and one or more non joint QCL indicators for the one or more beam pairs. For example, the UE 115 determines the joint and non-joint QCL indicators based on the beam measurement data and one or more thresholds, as described with reference to FIGS. 3 and 4. To illustrate, the UE 115 may determine a particular beam pair is joint QCL based on a corresponding measurement exceeding a threshold value. Additionally, or alternatively, UE 115 may compare measurement of multiple beam pairs to determine joint QCL or non-joint QCL and/or to rank beam pairs of a particular QCL type. For example, after three beam pairs have been identified as joint QCL based on a threshold, the three beam pairs may be sorted or ranked based on comparing their measurements. As another example, a subset or all beam measurement values may be compared, independent of a threshold determination, to generate a ranking or sorting of beam measurement. The top 3 performing beam pairs may be indicated as joint QCL and the bottom 3 performing beam pairs may be indicated as non-joint QCL. In other examples, the joint and non-joint QCL indicators correspond to measurements for a subset of beam pairs, as described with reference to FIG. 9.

At block 1003, the UE 115 transmits a measurement report, the measurement report including the one or more joint QCL indicators and the one or more non-joint QCL indicators. For example, the UE 115 determines a measurement report type and generates a measurement report, such as measurement report of FIGS. 4-9. The measurement report may enable a transmitting device (e.g., gNB) to perform enhanced beam management and selection operations as described herein based on the measurement report.

For example, the gNB may send data simultaneously to the UE based on beam pairs selected using the measurement report.

Additionally or alternatively, the UE 115 may receive data from one or more beam pairs of a plurality of beams at least partially concurrently, and determine one or more signal parameters for the one or more beam pairs. The UE 115 may further determine one or more joint quasi co-located (QCL) indicators for the one or more beam pairs and one or more non-joint QCL indicators for the one or more beam pairs, and may transmit a measurement report including an indicator configured to indicate whether the measurement report indicates joint QCL feedback or non-joint QCL feedback. As compared to the blocks 1000-1003, such a process may enable reduced overhead and adaptive reporting of an indication for a single QCL type, such as joint QCL or non-joint QCL. The indication is signaled by the indicator, such as an indicator bit or flag.

The UE 115 may execute additional blocks (or the UE 115 may be configured further perform additional operations) in other implementations. For example, the UE 115 may receive second data at least partially concurrently via a particular beam pair, where the beam pair was selected by the transmitting device based on the measurement report. As another example, the UE 115 may perform one or more operations described above. As yet another example, the UE 115 may perform one or more aspects as provided below.

In a first aspect, the measurement report comprises a channel state information (CSI) report.

In a second aspect, alone or in combination with the first aspect, the measurement report is configured to indicate cross-beam interference for simultaneous transmission or reception.

In a third aspect, alone or in combination with one or more of the previous aspects, the method further includes receiving, by the UE, a control message indicating one or more beams to be used to transmit second data, the one or more beams determined based on the measurement report; and receiving, by the UE, the second data via the one or more beams, the second data received based on the measurement report.

In a fourth aspect, alone or in combination with one or more of the previous aspects, determining the one or more signal parameters includes measuring, by the UE, the one or more signal parameters for each beam of the one or more beam pairs.

In a fifth aspect, alone or in combination with one or more of the previous aspects, the one or more signal parameters include received signal reference power (RSRP), signal-to-interference-plus-noise ratio (SINR), or both.

In a sixth aspect, alone or in combination with one or more of the previous aspects, measuring the one or more signal parameters for each beam of the one or more beam pairs generates beam measurement data, and further comprising ranking, by the UE, a set of beams of the plurality of beams based on the beam measurement data.

In a seventh aspect, alone or in combination with one or more of the previous aspects, further comprising generating, by the UE, the measurement report based on the one or more signal parameters for the one or more beam pairs.

In an eighth aspect, alone or in combination with one or more of the previous aspects, the measurement report includes information on at least one beam set, and wherein a particular beam set of the at least one beam set corresponds to a plurality of beams of a sector.

In a ninth aspect, alone or in combination with one or more of the previous aspects, the measurement report is generated based on maximum minimum signal-to-interference-plus-noise ratio (SINR) operations.

In a tenth aspect, alone or in combination with one or more of the previous aspects, a joint QCL indication is configured to indicate that the beam pair has a joint beam metric that satisfies a threshold.

In an eleventh aspect, alone or in combination with one or more of the previous aspects, a non-joint QCL indication is configured to indicate that the beam pair has a combined score that satisfies a threshold, the combined score based on one or more individual beam metrics.

In a twelfth aspect, alone or in combination with one or more of the previous aspects, the measurement report further comprises a preference indicator configured to indicate a preference for joint QCL or non-joint QCL beam candidates.

In a thirteenth aspect, alone or in combination with one or more of the previous aspects, the measurement report further comprises multiple type preference indicators configured to indicate at least one preference for joint QCL beam candidates and at least one preference for non-joint QCL beam candidates.

In a fourteenth aspect, alone or in combination with one or more of the previous aspects, the measurement report comprises a bitmap, the bitmap configured to indicate a ranking of one or more beam combinations.

In a fifteenth aspect, alone or in combination with one or more of the previous aspects, the bitmap indicates a preference for joint QCL or non-joint QCL for each rank combination of the one or more beam combinations, and wherein a rank of the rank combination indicates a number of multiple input multiple output (MIMO) layers.

In a sixteenth aspect, alone or in combination with one or more of the previous aspects, the UE further sorts the beams or the beam combination based on the one or more signal parameters to generate an array including a ranked list of beams or beam combinations, wherein the one or more signal parameters include received signal reference power (RSRP), signal-to-interference-plus-noise ratio (SINR), or a combination thereof, and wherein the measurement report comprises the array.

In an additional aspect, a method for wireless communication includes transmitting, by a network entity, data via one or more beam pairs of a plurality of beams at least partially concurrently; receiving, by the network entity, a measurement report, the measurement report including one or more joint quasi co-located (QCL) indicators and one or more non-joint QCL indicators for the one or more beam pairs; determining, by the network entity, a particular beam or beams for transmitting second data based on the measurement report; and transmitting, by the network entity, the second data using the particular beam or beams.

Accordingly, a UE and a base station may perform enhanced beam management and reporting for multiple beam transmission modes. By performing enhanced beam management and reporting, throughput and reliability may be increased.

Figure 13:
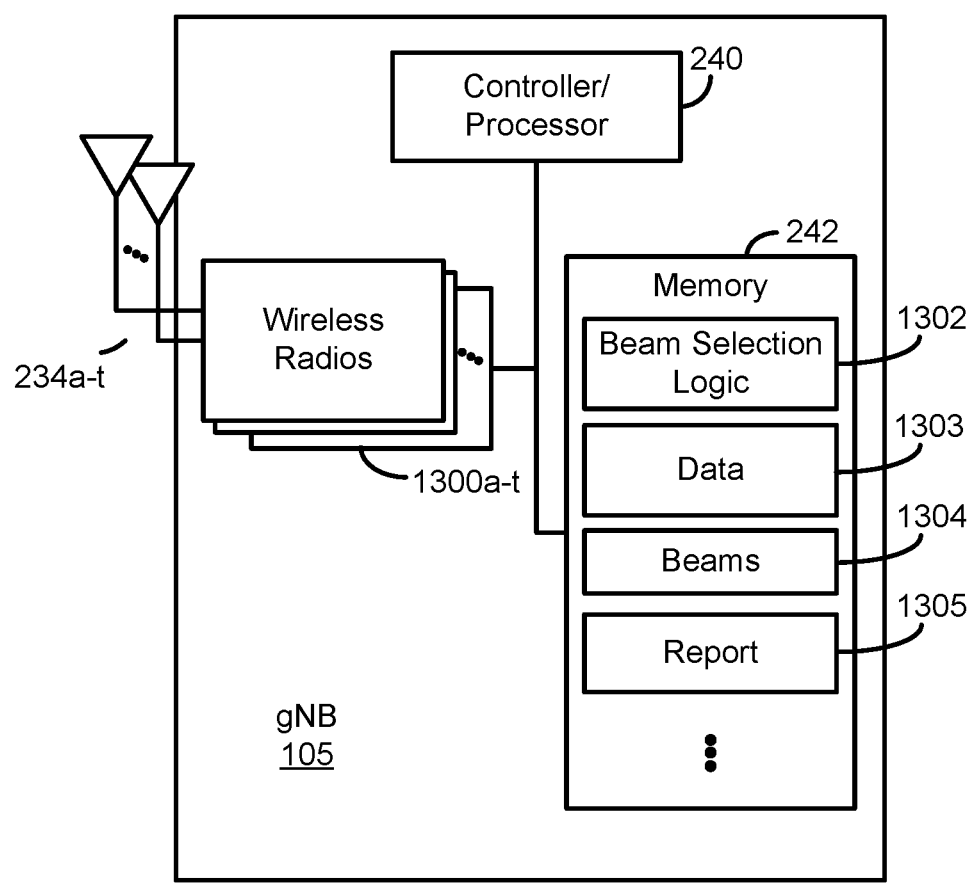
FIG. 13 is a block diagram conceptually illustrating a design of a base station configured to perform adaptive joint and non-joint QCL indications according to some embodiments of the present disclosure.

FIG. 11 is a block diagram illustrating example blocks executed by a base station configured according to an aspect of the present disclosure. The example blocks will also be described with respect to gNB 105 as illustrated in FIG. 13. FIG. 13 is a block diagram illustrating gNB 105 configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 1300 that provide the features and functionality of gNB 115. The gNB 115, under control of controller/processor 240, transmits and receives signals via wireless radios 1300*a-t* and antennas 234*a-t*. Wireless radios 1300*a-t* includes various components and hardware, as illustrated in FIG. 2 for gNB 105, including modulator/demodulators 232*a-t*, MIMO detector 236, receive processor 238, transmit processor 220, and TX MIMO processor 230. The memory 242 may store data for beam selection logic 1302, data 1303 (e.g., transmission data or data to be transmitted), beam data 1304, and report data 1305.

At block 1100, a wireless communication device, such as a base station, transmits data via one or more beam pairs of a plurality of beams at least partially concurrently. For example, gNB 105 transmits data via one or more beam pairs of a plurality of beams at least partially to a UE, as described with reference to block 1000.

At block 1101, the gNB 105 receives a measurement report, the measurement report including one or more joint quasi co-located (QCL) indicators and one or more non-joint QCL indicators for the one or more beam pairs. For example, the gNB 105 receives a measurement report from a UE, as described with reference to block 1001.

At block 1102, the gNB 105 determines a particular beam or beams for transmitting second data based on the measurement report. For example, the gNB 105 determines a particular beam based on beam pair rankings, beam pair preferences/indications, beam pair measurement values, or a combination thereof, included in or indicate by the measurement report, as described with reference to FIGS. 4 and 9.

At block 1103, the gNB 105 transmits the second data using the particular beam or beams. For example, the gNB 105 simultaneously transmits the second data using a particular beam pair determined or identified based on the measuring report.

The gNB 105 may execute additional blocks (or the gNB 105 may be configured further perform additional operations) in other implementations. For example, the gNB 105 may transmit signaling information for the second data. As another example, the gNB 105 may perform one or more operations described above. As yet another example, the gNB 105 may perform one or more aspects as provided below.

In a first aspect, the measurement report further comprises a bit configured to indicate whether the measurement report is for joint QCL or non-joint QCL.

In a second aspect, alone or in combination with the first aspect, the measurement report comprises a table including preference indicators for beam combinations, and wherein the measurement report further comprises a table indicator bit configured to indicate joint QCL or non-joint QCL indications for the table, and wherein the table further indicates a ranking for the indicated joint QCL or non-joint QCL indications.

In a third aspect, alone or in combination with one or more of the previous aspects, the measurement report comprises a table including preference indicators for beam combinations, and wherein the measurement report further comprises a table indicator bit configured to indicate joint QCL or non-joint QCL indications for the table, wherein the table includes a single bit for each beam pair combination, and wherein a first value of the single bit indicates a preference for an indicated QCL type and a second value indicates no preference for a non-indicated QCL type.

In a fourth aspect, alone or in combination with one or more of the previous aspects, the measurement report comprises a table including ranking indicators for beam combinations, and wherein at least one entry of the table includes a sign bit configured to indicate a sign for a corresponding table value, and wherein the sign is configured to indicate a joint QCL indication or a non-joint QCL indication.

In a fifth aspect, alone or in combination with one or more of the previous aspects, the measurement report comprises a table including ranking indicators for beam combinations, and wherein the table includes multiple rank indicators for at least one entry, wherein the multiple rank indicators include a first rank indicator for joint QCL and a second rank indicator for non-joint QCL, wherein the multiple rank indicators are configured to indicate a level of preference or ranking.

In a sixth aspect, alone or in combination with one or more of the previous aspects, the measurement report includes measurement values, and wherein the measurement values include individual received signal reference power (RSRP) values, individual signal-to-interference-plus-noise ratio (SINR) values, joint RSRP values, joint SINR values, or a combination thereof.

In a seventh aspect, alone or in combination with one or more of the previous aspects, the measurement report includes measurement values, and wherein the measurement report includes the measurement values for a subset of beams of the plurality of beams.

In an eighth aspect, alone or in combination with one or more of the previous aspects, the measurement report includes measurement values, and wherein the measurement report further includes an indication for at least one beam or at least one beam pair and is configured to indicate a preference for the at least one beam or the at least one beam pair.

In a ninth aspect, alone or in combination with one or more of the previous aspects the network entity further receives second data based on reflections of transmission beams determined based on the measurement report, and wherein the reflections form multiple sectors.

In a tenth aspect, alone or in combination with one or more of the previous aspects, the beams of the measurement report correspond to transmission beams and corresponding reception beams.

In an additional aspect, a method for wireless communication includes transmitting, by a network entity, data via one or more beam pairs of a plurality of beams at least partially concurrently; receiving, by the network entity, a measurement report, the measurement report including an indicator configured to indicate whether the measurement report indicates joint QCL feedback or non-joint QCL feedback; determining, by the network entity, a particular beam or beams for transmitting second data based on the measurement report; and transmitting, by the network entity, the second data using the particular beam or beams.

Additionally or alternatively, the gNB 105 may transmit data via one or more beam pairs of a plurality of beams at least partially concurrently and may receive a measurement report including an indicator configured to indicate whether the measurement report indicates joint QCL feedback or non-joint QCL feedback. The gNB 105 may further determine a particular beam or beams for transmitting second data based on the measurement report, and may transmit the second data using the particular beam or beams. As compared to the blocks 1100-1103, such a process may enable reduced overhead and adaptive reporting of an indication for a single QCL type, such as joint QCL or non-joint QCL. The indication is signaled by the indicator, such as an indicator bit of flag.

Accordingly, a UE and a base station may perform enhanced beam management and reporting for multiple beam transmission modes. By performing enhanced beam management and reporting, throughput and reliability may be increased.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to adaptive joint QCL and non-joint QCL indication may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 10 and 11) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a web site, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   receiving, by a user equipment (UE), data from one or more beam pairs of a plurality of beams at least partially concurrently;
   determining, by the UE, one or more signal parameters for the one or more beam pairs;
   determining, by the UE, one or more joint quasi co-located (QCL) indicators for the one or more beam pairs and one or more non-joint QCL indicators for the one or more beam pairs; and
   transmitting, by the UE, a measurement report, the measurement report including the one or more joint QCL indicators and the one or more non-joint QCL indicators.

2. The method of claim 1, wherein the measurement report comprises a channel state information (CSI) report.

3. The method of claim 1, wherein the measurement report is configured to indicate cross-beam interference for simultaneous transmission or reception.

4. The method of claim 1, further comprising:
   receiving, by the UE, a control message indicating one or more beams to be used to transmit second data, the one or more beams determined based on the measurement report; and
   receiving, by the UE, the second data via the one or more beams, the second data received based on the measurement report.

5. The method of claim 1, wherein determining the one or more signal parameters includes measuring, by the UE, the one or more signal parameters for each beam of the one or more beam pairs.

6. The method of claim 5, wherein the one or more signal parameters include received signal reference power (RSRP), signal-to-interference-plus-noise ratio (SINR), or both.

7. The method of claim 5, wherein measuring the one or more signal parameters for each beam of the one or more beam pairs generates beam measurement data, and further comprising ranking, by the UE, a set of beams of the plurality of beams based on the beam measurement data.

8. The method of claim 1, further comprising generating, by the UE, the measurement report based on the one or more signal parameters for the one or more beam pairs.

9. The method of claim 1, wherein the UE is configured for adaptive joint QCL and non-joint QCL reporting, and further comprising:
   transmitting, by the UE, a second measurement report, the second measurement report including one or more second joint QCL indicators, one or more second non-joint QCL indicators, or both, wherein the second measurement report has a different reporting format for joint QCL indicators and non-joint QCL than the measurement report.

10. An apparatus configured for wireless communication, the apparatus comprising:
    at least one processor; and
    a memory coupled to the processor, the processor is configured:
    to receive, by a user equipment (UE), data from one or more beam pairs of a plurality of beams at least partially concurrently;
    to determine, by the UE, one or more signal parameters for the one or more beam pairs;
    to determine, by the UE, one or more joint quasi co-located (QCL) indicators for the one or more beam pairs and one or more non-joint QCL indicators for the one or more beam pairs; and
    to transmit, by the UE, a measurement report, the measurement report including the one or more joint QCL indicators and the one or more non-joint QCL indicators.

11. The apparatus of claim 10, wherein the measurement report includes information on at least one beam set, and wherein a particular beam set of the at least one beam set corresponds to a plurality of beams of a sector.

12. The apparatus of claim 10, wherein the measurement report is generated based on maximum minimum signal-to-interference-plus-noise ratio (SINR) operations.

13. The apparatus of claim 10, wherein a joint QCL indication is configured to indicate that the beam pair has a joint beam metric that satisfies a threshold.

14. The apparatus of claim 10, wherein a non-joint QCL indication is configured to indicate that the beam pair has a combined score that satisfies a threshold, the combined score based on one or more individual beam metrics.

15. The apparatus of claim 10, wherein the measurement report further comprises a preference indicator configured to indicate a preference for joint QCL or non-joint QCL beam candidates.

16. The apparatus of claim 10, wherein the measurement report further comprises multiple type preference indicators configured to indicate at least one preference for joint QCL beam candidates and at least one preference for non-joint QCL beam candidates.

17. The apparatus of claim 10, wherein the measurement report comprises a bitmap, the bitmap configured to indicate a ranking of one or more beam combinations.

18. The apparatus of claim 17, wherein the bitmap indicates a preference for joint QCL or non-joint QCL for each rank combination of the one or more beam combinations, and wherein a rank of the rank combination indicates a number of multiple input multiple output (MIMO) layers.

19. The apparatus of claim 10, wherein the processor is further configured to sort the beams or beam combinations based on the one or more signal parameters to generate an array including a ranked list of beams or beam combinations, wherein the one or more signal parameters include received signal reference power (RSRP), signal-to-interference-plus-noise ratio (SINR), or a combination thereof, and wherein the measurement report comprises the array.

20. A method of wireless communication comprising:
    transmitting, by a network entity, data via one or more beam pairs of a plurality of beams at least partially concurrently;
    receiving, by the network entity, a measurement report, the measurement report including one or more joint quasi co-located (QCL) indicators and one or more non-joint QCL indicators for the one or more beam pairs;
    determining, by the network entity, a particular beam or beams for transmitting second data based on the measurement report; and
    transmitting, by the network entity, the second data using the particular beam or beams.

21. The method of claim 20, wherein the measurement report further comprises a bit configured to indicate whether the measurement report is for joint QCL or non-joint QCL, and wherein the beams of the measurement report correspond to transmission beams and corresponding reception beams.

22. The method of claim 20, wherein the measurement report comprises a table including preference indicators for beam combinations, and wherein the measurement report further comprises a table indicator bit configured to indicate joint QCL or non-joint QCL indications for the table, and wherein the table further indicates a ranking for the indicated joint QCL or non-joint QCL indications.

23. The method of claim 20, wherein the measurement report comprises a table including preference indicators for beam combinations, and wherein the measurement report further comprises a table indicator bit configured to indicate joint QCL or non-joint QCL indications for the table, wherein the table includes a single bit for each beam pair combination, and wherein a first value of the single bit indicates a preference for an indicated QCL type and a second value indicates no preference for a non-indicated QCL type.

24. The method of claim 20, wherein the measurement report comprises a table including ranking indicators for beam combinations, and wherein at least one entry of the table includes a sign bit configured to indicate a sign for a corresponding table value, and wherein the sign is configured to indicate a joint QCL indication or a non-joint QCL indication.

25. The method of claim 20, wherein the measurement report comprises a table including ranking indicators for beam combinations, and wherein the table includes multiple rank indicators for at least one entry, wherein the multiple rank indicators include a first rank indicator for joint QCL and a second rank indicator for non-joint QCL, wherein the multiple rank indicators are configured to indicate a level of preference or ranking.

26. An apparatus configured for wireless communication, the apparatus comprising:
  at least one processor; and
  a memory coupled to the processor, the processor is configured:
    to transmit, by a network entity, data via one or more beam pairs of a plurality of beams at least partially concurrently;
    to receive, by the network entity, a measurement report, the measurement report including one or more joint quasi co-located (QCL) indicators and one or more non-joint QCL indicators for the one or more beam pairs;
    to determine, by the network entity, a particular beam or beams for transmitting second data based on the measurement report; and
    to transmit, by the network entity, the second data using the particular beam or beams.

27. The apparatus of claim 26, wherein the measurement report includes measurement values, and wherein the measurement values include individual received signal reference power (RSRP) values, individual signal-to-interference-plus-noise ratio (SINR) values, joint RSRP values, joint SINR values, or a combination thereof.

28. The apparatus of claim 26, wherein the measurement report includes measurement values, and wherein the measurement report includes the measurement values for a subset of beams of the plurality of beams.

29. The apparatus of claim 26, wherein the measurement report includes measurement values, and wherein the measurement report further includes an indication for at least one beam or at least one beam pair and is configured to indicate a preference for the at least one beam or the at least one beam pair.

30. The apparatus of claim 26, wherein the processor is further configured to receive second data based on reflections of transmission beams determined based on the measurement report, and wherein the reflections are from multiple sectors.

* * * * *